United States Patent
Redelberger

Patent Number: 6,091,220
Date of Patent: Jul. 18, 2000

[54] DEVICE FOR DETECTING ROTOR SPEED OR POSITION IN A CONTINUOUSLY EXCITED ELECTRIC MOTOR

[75] Inventor: Harald Redelberger, Kürnach, Germany

[73] Assignee: Siemens Aktiengesellschaft, Munich, Germany

[21] Appl. No.: 09/040,943

[22] Filed: Mar. 19, 1998

Related U.S. Application Data

[63] Continuation of application No. PCT/EP96/03936, Sep. 9, 1996.

[30] Foreign Application Priority Data

Sep. 20, 1995 [EP] European Pat. Off. .............. 95114827

[51] Int. Cl.[7] .................................................. G05B 1/06
[52] U.S. Cl. ..................... 318/653; 310/68 R; 310/154
[58] Field of Search .................................. 310/259, 67 R, 310/68 R, 152–156; 318/652–655

[56] References Cited

U.S. PATENT DOCUMENTS

| | | | |
|---|---|---|---|
| 4,438,362 | 3/1984 | Brown | 310/156 |
| 4,535,275 | 8/1985 | Müller | 310/254 |
| 5,164,622 | 11/1992 | Kordik | 310/67 R |
| 5,241,267 | 8/1993 | Gleixner et al. | 324/207.2 |
| 5,404,673 | 4/1995 | Takeda et al. | 318/470 |
| 5,436,539 | 7/1995 | Wrenbeck et al. | 318/265 |
| 5,659,217 | 8/1997 | Petersen | 310/259 |

FOREIGN PATENT DOCUMENTS

| | | |
|---|---|---|
| 0359854 | 3/1990 | European Pat. Off. . |
| 0524384 | 1/1993 | European Pat. Off. . |
| 0544929 | 6/1993 | European Pat. Off. . |
| 2693054 | 12/1993 | France . |
| 4221424 | 1/1994 | Germany . |
| 1522822 | 8/1978 | United Kingdom . |

OTHER PUBLICATIONS

Schiefer, Integrierte Differenz–Hall—IC zur Positions– und Drehzahlerkennung, *Elektronik Informationen*, No. 5 (May 1995), pp. 96, 98, 100, (No Translation).

*Primary Examiner*—David S. Martin
*Attorney, Agent, or Firm*—Sughrue, Mion, Zinn, Macpeak & Seas, PLLC

[57] ABSTRACT

In an electric motor, a Hall sensor (3) is arranged in the vicinity of the outer circumference of the rotor (2) and of at least one of the permanent magnets (4–7) provided for operationally exciting the electric motor. At least one of the permanent magnets (4–7) is provided for generating the magnetic field inducing the Hall sensor (3). The rotor (2) has rotor teeth (2.1) and/or rotor slots (2.2) on the air-gap side and, in operation, produces magnetic field pulsations in proportion to the rotor speed.

10 Claims, 1 Drawing Sheet

DEVICE FOR DETECTING ROTOR SPEED OR POSITION IN A CONTINUOUSLY EXCITED ELECTRIC MOTOR

This is a Continuation of International Application PCT/EP96/03936, with an international filing date of Sep. 9, 1996, the disclosure of which is incorporated into this application by reference.

FIELD OF AND BACKGROUND OF THE INVENTION

The invention relates to a device for detecting the speed or position of a rotor in a continuously excited electric motor.

A device for detecting rotor speed or rotor position in a continuously excited electric motor by means of a Hall sensor induced by magnetic field pulsation, which is proportional to the rotor speed is known from the French publication FR-A-2 693 054 and the corresponding German publication DE-A1-42 21 424. The Hall sensor in these cases is arranged on the outer circumference of the stator, which surrounds the rotor, in the vicinity of one of the stator-side permanent magnets, which are provided for operationally exciting the electric motor.

The European reference EP-A-0 359 854 discloses a speed measuring device for a rotor-wound electric motor, in which an insulating end plate arranged at the end face of the rotor is constructed to rotate with the rotor and influence an assigned stator-side sensor either magnetically or optically and thereby produce an output which is proportional to the speed of the rotor.

OBJECTS OF THE INVENTION

It is an object of the invention to provide a device for detecting the rotor speed and/or rotor position in a continuously excited electric motor which, although mass-produced in an advantageously economic way, ensures sensitive, i.e. high-resolution, detection of rotor speed and/or position.

SUMMARY OF THE INVENTION

This and other objects are achieved by a device according to the invention.

According to the invention, a device is provided for detecting the rotor speed or rotor position in a continuously excited electric motor by means of a Hall sensor. The Hall sensor is induced by pulsations in a magnetic field that are proportional to the speed of the rotor. The rotor of the electric motor, which has rotor teeth and/or rotor slots on the air-gap side, generates the pulsations as it rotates. At least one of the stator-side permanent magnets, provided for operationally exciting the electric motor, generates a magnetic field that further induces the Hall sensor and creates a magnetic bias. The Hall sensor is arranged on the stator side in the vicinity of the outer circumference of the rotor, as well as in the vicinity of at least one of the permanent magnets. The Hall sensor is designed specifically as a differential Hall sensor.

In the device, the outlay for measurement can be substantially reduced by virtue of the fact that the permanent magnets, which are normally provided only to excite the electric motor operationally, are also used to create a static pre-magnetization for the Hall sensor. Additionally, the rotor teeth or rotor slots, which are conventionally provided for holding the rotor winding and have alternating permeance values thereby specified over the rotor circumference, are used for the pulsation, which is proportional to the rotor's speed, for the Hall sensor. Because of the high number of rotor teeth or rotor slots employed, in particular, in multipole motors, a high detection sensitivity of the rotor speed, or of the rotor position that can be derived therefrom, is nevertheless guaranteed by the invention. Again, because of the use of at least one differential Hall sensor it is possible to achieve reliable signal evaluation even in the case of small signal amplitudes or independently of fluctuations in the pre-magnetization induced by the permanent magnet.

It is expedient to integrate two Hall probes with a slight spacial separation, e.g. of about 2.5 mm, onto a single chip. Where there is a change from rotor tooth to rotor slot, these probes cause a different magnetic field at the location of one or the other Hall probe. This is done in such a way that the signal of the two Hall probes can be separated from the magnetic bias, and can thus be evaluated independently of fluctuations in the magnetic bias, by a differential circuit.

The tangential spacing between the end faces of two successive permanent magnets in the circumferential direction, which usually serves only for the insertion of spring clip parts used for bracing the permanent magnets against one another or against the motor housing, is expediently used to arrange the Hall sensor. As a result, it is easily possible, without the need for a separate and, in particular, additional installation space, to fix the Hall sensor advantageously both in the vicinity of the rotating rotor teeth or rotor slots and in the vicinity of the permanent magnets, which are used for the pre-magnetization of the sensor and are provided mainly for operationally exciting the electric motor.

BRIEF DESCRIPTION OF THE DRAWINGS

The invention and further advantageous refinements of the invention according to the features of the dependent claims are explained in more detail below with the aid of diagrammatic, exemplary embodiments in the drawing, in which:

DETAILED DESCRIPTION OF THE PREFERRED EMBODIMENTS

Figure 1:
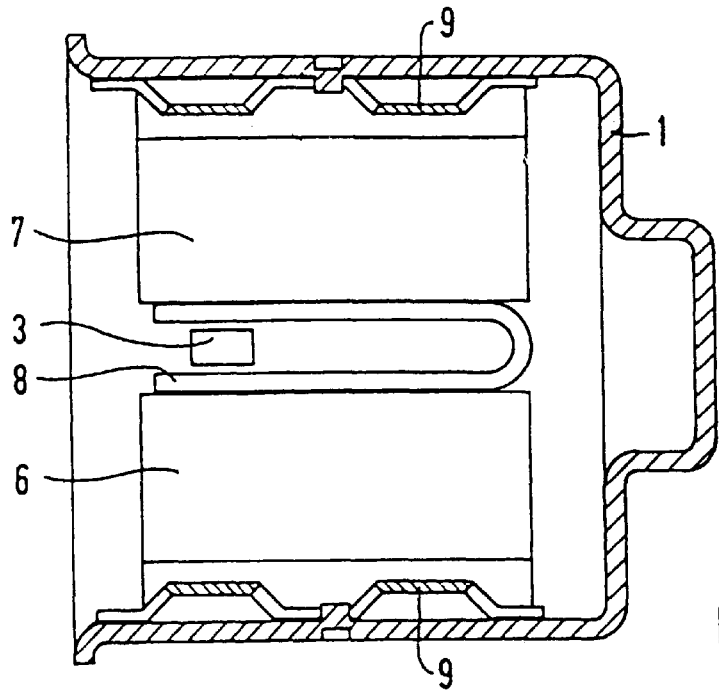
FIG. 1 shows an axial longitudinal section through a cup-shaped motor housing having permanent magnets, which are in the form of partial shells, provided for exciting the electric motor operationally, and which are held on the inner circumference of the housing.
Figure 2:
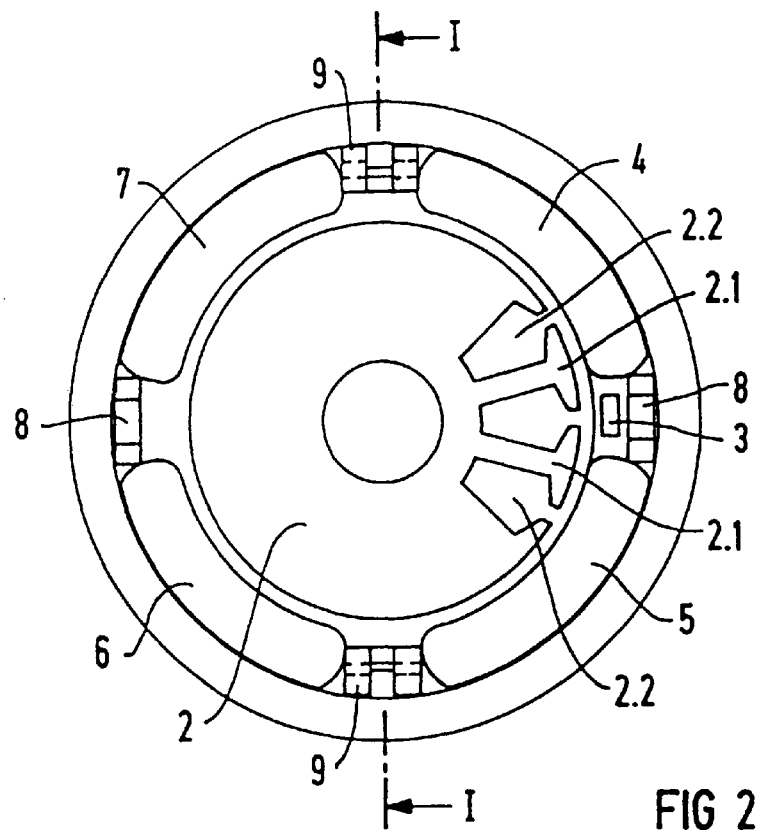
FIG. 2 shows a plan view of the end-face of the motor housing in accordance with FIG. 1, having an additionally inserted rotor provided with rotor teeth and rotor slots.

FIGS. 1 and 2 show a cup-shaped motor housing 1 of a continuously excited electric motor whose permanent magnets 4–7 are arranged on the inner circumference of the motor housing 1. The magnets 4–7 are shaped as partial shells, in conformance with the inner circumference of the motor housing, and serve to excite the motor operationally. Spring clips 8 or retaining clips 9 are used to position and secure the permanent magnets 4–7. These clips 8,9 are inserted axially into tangential interspaces between the permanent magnets 4–7. More particularly, the clips abut respective end faces, situated tangentially opposite one another, of the circumference successively positioned magnets 4–7. The clips press these magnets both against one another and against the surface of the inner circumference of the motor housing 1.

FIG. 2 further depicts a rotor, omitted in FIG. 1 for the sake of clarity, which is not yet provided with a rotor winding. The rotor 2 has rotor teeth 2.1 and rotor slots 2.2, which are distributed over the circumference alternating with one another and serve to hold the rotor winding.

The Hall sensor 3 is arranged, for the purpose of determining rotor speed or position in accordance with the invention, in one of the tangential interspaces between the opposite end faces of one permanent magnet (e.g., 4) and the next permanent magnet (e.g., 5) which follows on the circumference. As stationary components, the permanent magnets 4 and 5 provide this Hall sensor 3 with a magnetic bias. However, since the Hall sensor 3 is arranged not only in the vicinity of the permanent magnets 4 and 5 but also in the vicinity of the surface of the outer circumference of the rotor 2, the latter is advantageously also used to produce a different magnetic field, and thus an output signal at the Hall sensor 3, which is proportional to the speed of the rotor. It does this by alternating from tooth to slot, relative to the sensor 3, to produce a corresponding alternation in the permeance.

The Hall sensor 3 is preferably designed as a differential Hall sensor with two Hall probes arranged with a mutual tangential spacing on a chip. Designing the Hall sensor 3 as a differential Hall sensor means that the alternation from rotor tooth 2.1 to rotor slot 2.2 produces a different magnetic field at the location of one probe of the differential Hall sensor in comparison to that at the other probe. The signals from the two probes can subsequently be separated from the magnetic bias by a differential circuit in such a way that fluctuations in the magnetic bias, which arise, for example, because of temperature effects, fail to influence the detection of the rotor speed. Structural and operational details regarding differential Hall sensors are known to those skilled in the art, e.g., from "Integrierte Differenz-Hall-IC zur Positions- und Drehzahlerkennung" (Integrated Differential Hall IC for Position- and Rotation Speed Recognition), *Elektronik Informationen,* which is incorporated into the present application by reference.

Through the use of an appropriate conventional evaluation circuit (not shown), it is also possible to determine the rotor position, or the stroke path of a component moved by the electric motor in an actuator, such as, for example, a window in a window lifter drive, or a sliding roof in a sliding roof drive, of a motor vehicle. This is done on the basis of the number of pulses detected by the Hall probe 3, the frequency of which is proportional to the rotor speed, in conjunction with a high resolution of the respective rotor position, for example on the basis of an initialization position, fixed at the outset, and subsequent incremental pulse detection. To make this determination, it is expedient to provide a commutator motor fed from the DC system of a motor vehicle as the continuously excited collector motor. It is also expedient to use the device according to the invention for the purpose of stroke path monitoring with a quickly reacting anti-jamming protection system when the window or the sliding roof moves against an obstacle. Details regarding such window lifter drive systems and anti-jamming protection systems therefor are described, e.g., in U.S. Pat. No. 5,404,673 and U.S. Pat. No. 5,436,539, the disclosures of which are hereby incorporated into the present application by reference.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A device for detecting at least one of a rotor speed and a rotor position in a continuously excited electric motor, comprising:

a) a rotor of the electric motor, said rotor having at least either rotor teeth or rotor slots defining an outer circumference on an air-gap side of said rotor, and said rotor generating a magnetic field pulsation that is proportional to a speed of said rotor;

b) a plurality of stator-side permanent magnets for operationally exciting the electric motor; and c) a differential Hall sensor arranged on the stator side in a vicinity of the outer circumference of the rotor and of at least one of said permanent magnets; wherein
said Hall sensor is induced by a magnetic field generated by at least one of said permanent magnets; and
said Hall sensor is further induced by the magnetic field pulsation generated by said rotor for detecting the speed of the rotor.

2. The device as claimed in claim 1, wherein:

end faces of two circumferentially successive ones of said permanent magnets define a clearance between said two magnets; and said Hall sensor is arranged in the clearance.

3. The device as claimed in claim 2, wherein:

said permanent magnets are each arcuate in shape and arranged successively so as to surround said rotor.

4. The device as claimed in claim 1, wherein:

the magnetic field of said at least one permanent magnet induces a magnetic bias in said differential Hall sensor; and said differential Hall sensor comprises two spatially separated Hall probes and produces a differential signal that is proportional to the speed of the rotor and that is independent of the magnetic bias of said differential Hall sensor.

5. The device as claimed in claim 4, wherein:

said two spatially separated Hall probes are integrated into a unitary subassembly.

6. The device as claimed in claim 1, wherein the electric motor is a continuously excited commutator motor.

7. The device as claimed in claim 1, wherein:

the electric motor is a drive for an actuator; and said Hall sensor detects at least one of a speed or a position of the actuator on the basis of the detection of the speed of said rotor.

8. The device as claimed in claim 7, wherein the actuator is an actuator for a motor-actuable window lifter drive or a sliding roof drive in a motor vehicle.

9. The device as claimed in claim 8, wherein:

said Hall sensor detects at least one of a speed or a position of the actuator for monitoring a stroke path of the window or the sliding roof driven by the actuator.

10. An apparatus comprising:

a) a rotably mounted rotor having an outer circumferential periphery and generating magnetic field pulsations proportional in frequency to a rotational speed of said rotor;

b) a fixed stator assembly comprising a plurality of permanent magnets arranged circumferentially around said rotor; and c) a transducing element having a magnetic-field-sensitive probe arranged between two of said permanent magnets, said probe producing a transducer signal indicative of the magnetic field pulsations.

* * * * *